May 17, 1955 J. L. HATHAWAY 2,708,738
PULSE TRANSMITTERS
Filed Feb. 11, 1947
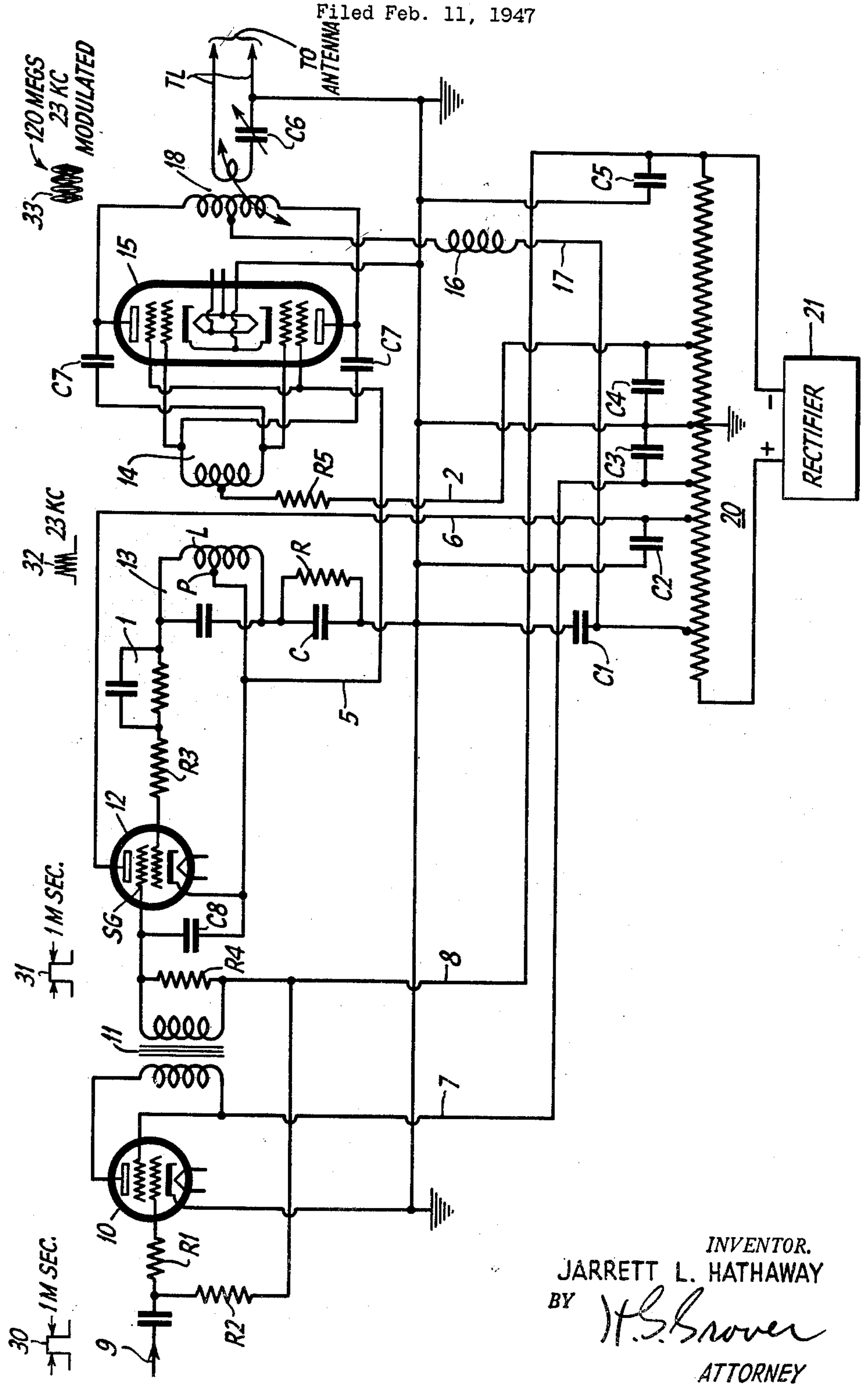
INVENTOR.
JARRETT L. HATHAWAY
BY H. S. Grover
ATTORNEY 2,708,738

PULSE TRANSMITTERS

Jarrett L. Hathaway, Manhasset, N. Y., assignor, by mesne assignments, to the United States of America as represented by the Secretary of the Army Application February 11, 1947, Serial No. 727,854

7 Claims. (Cl. 332—14)

This invention relates to pulse transmitters, and particularly to a method of and apparatus for producing pulses of modulated radio frequency energy whose durations are short compared to the intervals between pulses.

An object of the present invention is to provide a pulse transmitter which can be modulated up to the order of 100% and whose output power is considerably greater than the average input power.

Another object of the invention is to provide a highly compact, lightweight, simplified pulse transmitter capable of being fully modulated and requiring relatively low energy input power compared to the output power.

A further object of the invention is to provide a fully modulated pulse transmitter capable of producing radio frequency modulated pulses in response to and whose duration is a function of unmodulated input pulses.

One application of the present invention is an air-borne camera equipment of the type useful for synchronously firing a photo-flash bomb, such as is described in copending application Serial No. 662,979, filed April 18, 1946, by Allan A. Walsh, assigned to the common assignee. In this copending application, the transmitter designated 16 is a diagrammatic illustration of the transmitter of the present invention.

A detailed description of the invention follows in conjunction with a drawing, whose single figure illustrates the pulse transmitter of the present invention.

Referring to the drawing in more detail, there is shown a radio pulse transmitter which is designed to produce fully modulated output power pulses in response to input D. C. pulses and at a very slow repetition rate, for example, at a rate of one every three seconds. These input pulses are of equal length and each have a duration of the order of one millisecond, as a result of which there is a very favorable duty cycle. The term "duty cycle" is well known in the art as being the ratio of the actual time occupied by a pulse during a cycle compared to the total time of the cycle.

The transmitter of the invention includes a vacuum tube amplifier 10 whose grid is fed by the incoming D. C. pulses, a modulator-oscillator 12 whose screen grid is fed by the ouput from the amplifier 10, and a radio frequency oscillator 15 which is turned on and modulated by the modulator-oscillator 12. In the absence of any incoming pulses, all three stages 10, 12, and 15 are biased beyond cut-off so as to prevent power drain during the long intervals between incoming pulses. In fact, the modulator-oscillator 12 is keyed "on" by a positive pulse from the output of the amplifier 10. The modulator-oscillator circuit is provided with a tank oscillation circuit 13 which produces oscillations at a frequency of the order of 23 kilocycles each time. This circuit is turned "on" by an incoming pulse. Output is taken from the 23 kc. tank circuit 13 with a D. C. component superimposed and applied to the screen grids of the radio frequency oscillator 15 for keying this radio frequency oscillator. The radio frequency oscillator 15 produces a pulse of 120 megacycles radio frequency energy which is fully modulated by the 23 kc. energy of one millisecond duration supplied by the modulator-oscillator. All of the D. C. voltages for the transmitter, including positive anode supply and the negative bias for the grids, are obtained from a single power supply, herein shown as a bleeder resistor 20 which is fed by a rectifier 21. Storage condensers C1, C2, C3, C4, and C5 are connected to all of the voltage taps on the bleeder resistor 20 and are of sufficient capacity to regulate the voltages during the occurrence of the short pulses.

Incoming pulses of one millisecond duration and occurring at a rate of once each three seconds or slower and having a shape similar to that shown by pulse 30 is applied to lead 9 and then to the control grid of vacuum tube 10. Vacuum tube 10 is normally biased beyond cut-off by means of a negative bias supplied through lead 8 and grid resistor R2. Resistor R1 is a parasitic suppressor. These incoming pulses, it should be noted, are of positive polarity and are of sufficient magnitude to overcome the cut-off bias on tube 10 and cause this tube to conduct for the duration of the incoming pulses. Output pulses from the amplifier 10 are passed through the iron core transformer 11 and fed to the screen grid SG of the modulator-oscillator 12. The pulses applied to the screen grid 12 are of D. C. potential and of positive polarity and wave shape, as shown by pulse 31. The resistor R4 and the condenser C8 are so chosen that the wave shape 31 is obtained. In the absence of pulses supplied to the screen grid of the tube 12, this tube is biased beyond cut-off by a negative bias supply through lead 8. The magnitude of the D. C. pulse 31 supplied to the screen grid SG is sufficient to overcome the negative bias on tube 12 and cause this tube to conduct for the duration of the applied pulses. The first grid of the modulator-oscillator 12 is connected to one terminal of a tank circuit 13 through a parasitic suppressor R3 and a grid leak-condenser combination 1. The other terminal of the tank circuit 13 is connected through a parallel combination of condenser C and resistor R to ground. Tank circuit 13 is tuned to a supersonic frequency; in this case 23 kc., and oscillations are produced therein each time the modulator-oscillator passes current in the manner of a Hartley oscillator. When tube 12 is conducting, the entire coil L of the tank circuit 13 is raised in D. C. potential and the resulting oscillation potential is superimposed upon the D. C. This combination of D. C. potential and superimposed oscillation potential may be termed "the modulating potential" for the succeeding radio frequency oscillator 15.

At this time it may be noted that the anodes of the tubes 10 and 12 are supplied with anode polarizing potentials through leads 7 and 6, respectively, which extend to selected points on the bleeder resistor 20.

Output energy from the modulator-oscillator for keying the radio frequency oscillator 15 is taken from a tapping point P on the coil L and fed through lead 5 to the screen grids of the dual-vacuum tube 15. This output energy is the "modulation potential" in the form of pulses and of the shape shown by way of wave form 32, and of sufficient magnitude and sense to overcome the cut-off bias for the radio frequency oscillator 15. This cut-off bias for tube 15 is supplied to the first grids of this radio frequency oscillator through radio frequency isolation resistor R5 and lead 2. In the absence of pulses applied to the screen grids of the radio frequency oscillator 15, this negative bias is sufficient to cut-off the flow of current through this oscillator. The values of resistor R and condenser C in the modulator-oscillator circuit are such as to produce a final radio frequency pulse in the output of the oscillator 15 which is fully modulated, that is, has substantially 100% modulation. The output pulse from the radio frequency oscillator 15 may have a shape similar to the wave form 33. A high value for resistor R will cause a lower percentage of modulation and, conversely, a low value of resistor R will cause a higher percentage of modulation.

The oscillator 15 is provided with feedback condensers C7, C7 each of which extends from the anode of one section of the dual-tube to the grid of the other section of the dual tube. These feedback condensers serve to establish radio frequency oscillations at a frequency determined mainly by the grid and plate inductances, 14 and 18 respectively. Output from the radio frequency oscillator 15 is in the form of pulses constituted by radio frequency energy of 120 megacycles modulated by 23 kilocycles. This radio frequency output energy is fed through transformer 18 to the line TL which extends to a stable utilization circuit, such as an antenna. The condenser C6 serves to tune the combination of transmission line TL and the secondary winding of the transformer 18.

Anode supply for the radio frequency oscillator 15 is provided through radio frequency choke coil 16 and lead 17, in turn, connected to a stable point on the bleeder resistor 20.

It should be noted that all connections to the bleeder supply 20 for supplying anode polarizing potential and negative bias for the tubes are shunted to ground through condensers C1 to C5 inclusive, respectively. These condensers C1 to C5 store energy in the absence of applied pulses, and a small portion of this energy is utilized during the occurrence of a pulse. They are then recharged during the period between pulses. The values of these condensers are also such that there is obtained sufficient voltage regulation to maintain the pulse shape.

In one particular embodiment of the invention, actually tried out in practice, the peak output power was approximately 7 kilowatts feeding into a 70 ohm resistive load, while the input power to the power supply including filament supply was only 50 watts. This transmitter was very compact and was contained in a box whose dimensions were approximately 19 inches long, 10 inches wide and 8 inches high and which weighed about 33 lbs. Such a highly compact and lightweight equipment was found to be extremely useful in airplanes where weight and space are important factors to be considered, particularly in military planes where speed is a factor and which must fly at considerable heights, for example, 40 thousand feet above sea level.

The term "ground" used in the description and the appended claims is not limited to an actual earth connection but is deemed to include any neutral point of zero radio frequency potential. This ground connection may be the metallic chassis and housing of the transmitter.

The invention is not limited to the specific values mentioned for the pulse repetition rate, pulse duration, modulating frequency, or radio frequency.

What is claimed is:

1. A pulse producing system comprising a first oscillator and a second oscillator fed and controlled by said first oscillator, said first oscillator producing oscillations of a frequency lower than the frequency of oscillations produced by said second oscillator, means for biasing both of said oscillators beyond the current self-oscillating condition to prevent oscillations thereof, and means for supplying spaced controlling pulses to said first oscillator of such sense and magnitude as to overcome the cut-off bias on said first oscillator and cause it to oscillate during the occurrence of said pulses, to thereby also cause the second oscillator to oscillate during the occurrence of said pulses.

2. A pulse transmitter comprising an amplifier tube, a modulator-oscillator coupled to the output of said tube, a radio frequency oscillator coupled to and controlled by said modulator-oscillator, means for biasing said amplifier tube, modulator-oscillator and said radio frequency oscillator beyond cut-off, and means for supplying to said amplifier tube a pulse of such magnitude as to overcome the cut-off bias thereon and cause it, in turn, to produce a pulse of sufficient magnitude and sense to overcome the cut-off bias on said modulator-oscillator.

3. A pulse transmitter comprising an amplifier tube, a modulator-oscillator so constructed and arranged as to produce oscillations of a supersonic frequency, a coupling between the output of said amplifier and said modulator-oscillator, a radio frequency oscillator coupled to and controlled by the output from said modulator-oscillator, a pulse input circuit coupled to said amplifier tube, and means for normally biasing said amplifier tube, modulator-oscillator and said radio frequency oscillator beyond cut-off in the absence of pulses in said input circuit.

4. A pulse transmitter comprising the combination of a screen-grid modulator-oscillator having a tuned circuit connected between one of its grids and ground, a connection from another of its grids to a source of D. C. pulses, a connection from the cathode of said modulator-oscillator to a point on said tuned circuit, and a grid-controlled radio frequency oscillator, and a connection from a grid of said radio frequency oscillator to a point on said tuned circuit, and means for normally biasing said modulator-oscillator and said radio frequency oscillator beyond cut-off, the magnitude and sense of the D. C. pulses emanating from said source being such as to overcome the cut-off bias on said modulator-oscillator and cause it to pass current.

5. A pulse transmitter comprising a screen grid modulator-oscillator tube having a cathode, a control grid, and a screen grid, a parallel tuned circut of coil and condenser having one terminal connected to said control grid and another terminal connected through a resistor-parallel-condenser combination to ground, a connection from said cathode to a point intermediate the ends of said coil, a radio frequency oscillator having first and second grids, a connection from the second grid of said last oscillator to a point on said coil, means for supplying cut-off bias to the screen grid of said modulator-oscillator and to the first grid of said radio frequency oscillator, and a source of voltage pulses connected to the screen grid of said modulator-oscillator.

6. A pulse transmitter comprising a screen grid modulator-oscillator tube having a cathode, a control grid, a screen grid and an anode, a parallel tuned circuit of coil and condenser having one terminal connected to said control grid and another terminal connected through a resistor-parallel-condenser combination to ground, a connection from said cathode to a point intermediate the ends of said coil, a radio frequency oscillator having first and second grids, and an anode, a connection from the second grid of said last oscillator to a point on said coil, means including a common bleeder resistor for supplying cut-off bias to the screen grid of said modulator-oscillator and to the first grid of said radio frequency oscillator, connections from said common bleeder resistor to said anodes for supplying anode polarizing potentials, condensers from said last connections and from said means to ground, whereby said condensers regulate the power supply potentials, and a source of voltage pulses connected to the screen grid of said modulator-oscillator.

7. A pulse transmitter in accordance with claim 5, in which said modulator-oscillator produces oscillations of a supersonic frequency when keyed by said voltage pulses.

References Cited in the file of this patent

UNITED STATES PATENTS 2,392,114 Bartelink ............... Jan. 1, 1946